United States Patent
Fraschini

(10) Patent No.: US 11,487,006 B2
(45) Date of Patent: Nov. 1, 2022

(54) IMAGING METHOD, AN APPARATUS IMPLEMENTING SAID METHOD, A COMPUTER PROGRAM AND A COMPUTER-READABLE STORAGE MEDIUM

(71) Applicant: SUPERSONIC IMAGINE, Aix-en-Provence (FR)

(72) Inventor: Christophe Fraschini, Aix-en-Provence (FR)

(73) Assignee: SUPERSONIC IMAGINE, Aix-en-Provence (FR)

( * ) Notice: Subject to any disclaimer, the term of this patent is extended or adjusted under 35 U.S.C. 154(b) by 553 days.

(21) Appl. No.: 15/780,914

(22) PCT Filed: Dec. 1, 2015

(86) PCT No.: PCT/IB2015/002652
§ 371 (c)(1),
(2) Date: Jun. 1, 2018

(87) PCT Pub. No.: WO2017/093778
PCT Pub. Date: Jun. 8, 2017

(65) Prior Publication Data
US 2020/0256988 A1    Aug. 13, 2020

(51) Int. Cl.
*G01S 7/52* (2006.01)
*G01S 15/89* (2006.01)

(52) U.S. Cl.
CPC ...... *G01S 15/8997* (2013.01); *G01S 7/52049* (2013.01); *G01S 15/8959* (2013.01)

(58) Field of Classification Search
CPC ...... G09B 23/286; G16H 20/17; G16H 30/20; G16H 40/60; A61M 5/1456; A61M 5/007;
(Continued)

(56) References Cited

U.S. PATENT DOCUMENTS 6,048,315 A    4/2000    Chiao et al.
6,213,946 B1 *    4/2001    Brock-Fisher ...... G01S 7/52046
                                                    600/443
(Continued)

FOREIGN PATENT DOCUMENTS

JP    2015-058046 A    3/2015
WO    2016100284 A1    6/2016

OTHER PUBLICATIONS

Fauzia Ahmad et al., "Synthetic Aperture Beamformer for Imaging Through a Dielectric Wall", Jan. 2004, IEEE Transactions on Aerospace and Electronic Systems, vol. 41, No. 1, pp. 271-23 (Year: 2005).*

(Continued)

*Primary Examiner* — Yi-Shan Yang
*Assistant Examiner* — Adil Partap S Virk
(74) *Attorney, Agent, or Firm* — Nixon & Vanderhye

(57) ABSTRACT

Disclosed is an imaging method for producing an image of a region inside a medium by an array of transducers, including the a transmission step of a plurality of waves inside the medium, a reception step for acquiring a set of data, a beamforming step providing a plurality beamformed pixel values depending on various transmit weighting vectors, and a combining step for combining the beamformed pixel values into a pixel value of each pixel in the image. The transmit weighting vectors are different and orthogonal one to another one.

14 Claims, 8 Drawing Sheets

(58) Field of Classification Search
CPC .... A61M 2205/502; A61M 2205/3576; A61M 2205/6072; A61B 6/481; A61B 8/481; A61B 6/463; A61B 6/465; A61B 8/465; A61B 8/54; A61B 6/54; A61B 8/463; G01R 33/5608; G01R 33/5601

See application file for complete search history.

(56) References Cited

U.S. PATENT DOCUMENTS

| | | | |
|---|---|---|---|
| 6,551,246 | B1 | 4/2003 | Ustuner et al. |
| 8,743,657 | B1* | 6/2014 | Barton, III ............ G01S 15/003 367/88 |
| 2008/0298424 | A1 | 12/2008 | Khan et al. |
| 2009/0234230 | A1 | 9/2009 | Bercoff et al. |
| 2013/0083628 | A1* | 4/2013 | Qiao ................... G01S 15/8927 367/87 |
| 2013/0109971 | A1* | 5/2013 | Dahl ................... G01S 15/8977 600/447 |
| 2014/0364736 | A1* | 12/2014 | Huang ................ G01S 15/8997 600/447 |
| 2017/0363725 | A1* | 12/2017 | Ignjatovic ........... G01S 15/8915 |

OTHER PUBLICATIONS

Dong-Lai Liu et al., "About the Application of the Van Cittert-Zernike Theorem in Ultrasonic Imaging", Jul. 1995, IEEE Transactions on Ultrasonics, Ferroelectrics, and Frequency Control, vol. 42, No. 4, pp. 590-601 (Year: 1995).*

Riedel et al., "Minimum Bias Multiple Taper Spectral Estimation", Jan. 1995, IEEE Transactions on Signal Processing, vol. 43, No. 1, pp. 188-195 (Year: 1995).*

Jim Lambers, "MAT 169 Fall Semester Oct. 2009 Lecture 21 Notes", 2009 (Year: 2009).*

Jorgen Arendt Jensen et al., "Synthetic Aperture Ultrasound Imaging", Aug. 11, 2006, Ultrasonics, pp. e5-e15 (Year: 2006).*

Bae et al., "A Study of Synthetic-Aperture Imaging with Virtual Source Elements in B-Mode Ultrasound Imaging Systems," IEEE Transactions on Ultrasonics, Ferroelectrics, and Frequency Control, vol. 47, No. 6, Nov. 2000, pp. 1510-1519.

Couade et al., "Ultrafast imaging of the heart using Circular Wave Synthetic Imaging with Phased Arrays," 2009 IEEE International Ultrasonics Symposium Proceedings, pp. 515-518.

Denarie et al., "Coherent Plane Wave Compounding for Very High Frame Rate Ultrasonography of Rapidly Moving Targets," IEEE Transactions on Medical Imaging, vol. 32, No. 7, Jul. 2013, pp. 1265-1276.

Jensen, A. et al., "A Multipaper Approach to Speckle Reduction for Medical Ultrasound Imaging," 2011 IEEE International Ultrasonics Symposium Proceedings, pp. 397-400.

Jensen, J. et al., "Synthetic aperture ultrasound imaging," Ultrasonics 44 (2006), pp. e5-e15.

Kortbek, J. et al., "Synthetic Aperture Sequential Beamforming," 2008 IEEE International Ultrasonics Symposium Proceedings, pp. 966-969.

Mallart et al., "The van Cittert-Zernike theorem in pulse echo measurements," J. Acoust. Soc. Am. 90 (5), Nov. 1991, pp. 2718-2727.

Montaldo et al, "Coherent Plane-Wave Compounding for Very High Frame Rate Ultrasonography and Transient Elastography," IEEE Transactions on Ultrasonics, Ferroelectrics, and Frequency Control, 56(3), pp. 489-506, Mar. 2009.

Mosca et al., "Synthese d'emission spatio-temporelle pour l'imagerie acoustique," Traitement du signal et l'image, Telecom ParisTech, 2010.

Mosca et al., "Temporal approach of the synthetic aperture imaging using Hadamard matrix," The Journal of the Acoustical Society of America, Jun. 2008.

Riedel et al., "Minimum bias multiple taper spectral estimation," Courant Institute of Mathematical Sciences, New York University, pp. 1021.

Wright, "Image Formation in Diagnostic Ultrasound," 1997 IEE International Ultrasonics Symposium Short Course, pp. 1-71.

International Search Reported, dated Sep. 12, 2016, from corresponding PCT application No. PCT/IB2015/002652.

* cited by examiner

IMAGING METHOD, AN APPARATUS IMPLEMENTING SAID METHOD, A COMPUTER PROGRAM AND A COMPUTER-READABLE STORAGE MEDIUM

FIELD OF THE INVENTION

The present invention relates to imaging methods and apparatus implementing said methods, in particular for medical imaging.

BACKGROUND OF THE INVENTION

The present invention concerns more precisely an imaging method for producing an image of a region inside a medium, and more precisely an ultrasound imaging method.

The method is implemented by a processing unit connected to an array of transducers in relation with said medium.

This kind of image produced by reflexion waves in response to incident waves often comprise a speckle noise that corresponds to random fluctuations in the reflexion waves from the region of interest. This speckle noise causes difficulties for image interpretation.

The speckle noise can be reduced by averaging a plurality of images because each image has a speckle noise different than an other image of said plurality.

Eventually, the images for averaging can be obtained by observing the region from different angles (spatial compounding) or by varying the signal frequencies (frequency compounding).

Eventually, a plurality of different receive weighting vectors can be applied on receive beamforming so as to obtain averaged images.

However all these methods increase the number of acquisitions to be done, reduce the frame rate, and sometimes reduce the resolution of the produced image.

OBJECTS AND SUMMARY OF THE INVENTION

One object of the present invention is to provide an other imaging method for producing an image of a region inside a medium having a reduced speckle noise, and not having the drawbacks of prior art methods.

To this effect, the method comprises the following steps:
(a) a transmission step in which a first plurality of waves are transmitted inside the medium by the transducers,
(b) a reception step in which a set of data is acquired by said transducers in response to the waves,
(c) a beamforming step in which the set of data is processed by a second plurality of beamforming processes for providing beamformed pixel values of at least a portion of the image, each beamforming process either using a set of data corresponding to waves generated with a transmit weighting vector, or using a transmit weighting vector in the calculus of the beamformed pixel value, and
(d) a combining step in which the beamformed pixel values of said second plurality are combined to provide a pixel value of a pixel inside the image, and wherein the transmit weighting vectors are different and orthogonal one to an other one.

Thanks to these features, each transmit weighting vector generates an uncorrelated speckle noise, and the combination of the weighted data allow to compute an image of the region having a reduced speckle noise.

In various embodiments of the imaging method, one and/or other of the following features may optionally be incorporated.

According to an aspect of the method:
during the transmission step (a), each transmit weighting vector is used for generating a wave, and
during the beamforming step (c), the beamforming process is a conventional beamforming in which the beamformed pixel values are calculated by the following formula:

$$U_n(x, z) = \sum_{l=l1}^{l2} W_R[l] DS(k - \tau(x, z, l), l, m)$$

where
DS(k, l, m) is a matrix of the set of data,
$W_R$ is a receive weighting vector,
$\tau(x, z, l)$ is a delay function adapted for the beamforming process,
l is an index of a transducer in the array 2, comprised between l1 and l2, an aperture for beamforming a line, and
x, z are coordinates of a pixel inside the image.

According to an aspect of the method, the transmit weighting vectors are applied during the beamforming step (c), and
during the beamforming step (c), the beamforming process is a synthetic beamforming in which the beamformed pixel values are calculated by the following formula:

$$U_n(x, z) = \sum_{m=1}^{M} W_{Tn}[m] \sum_{l=l1}^{l2} W_R[l] DS(k - \tau(x, z, l), l, m)$$

where
DS(k, l, m) is a matrix of the set of data,
$W_R$ is a receive weighting vector,
$\tau(x, z, l)$ is a delay function adapted for the beamforming process,
l is an index of a transducer in the array 2, comprised between l1 and l2, an aperture for beamforming a line,
m is the index, comprised between l and M, M being the first plurality that is the number of transmitted waves inside medium,
$W_{Tn}$ is the transmit weighting vector,
x, z are coordinates of a pixel inside the image.

According to an aspect of the method, the synthetic beamforming process is chosen in a list comprising synthetic aperture focusing technique (SAFT) beamforming process, virtual transducer SAFT beamforming process, spatially coded SAFT beamforming process, circular wave synthetic beamforming process, plane wave synthetic beamforming process.

According to an aspect of the method, the pixel values of the image are calculated during the combining step (d) by the following formula:

$$I(x, z) = \sum_{n=1}^{N} |U_n(x, z) + iHT\{U_n(x, z)\}|^2$$

wherein
i is the complex unit imaginary number.
n is the index, comprised between I and N, N being the second plurality that is the number of transmit weighting vectors,
|X| is the modulus of X,
HT{X} is the Hilbert transform of X,
$U_n(x, z)$ is a beamformed pixel value of said second plurality.

According to an aspect of the method, the transmit weighting vectors are determined by an orthogonal function chosen in a list comprising a Riedel-Sidorenko function, a Discrete prolate spheroidal function and a Hadamard function.

According to an aspect of the method, the transducers are ultrasound transducers that transmit or receive ultrasound waves, and the method produces an ultrasound image of the region inside the medium.

According to an aspect of the method, it further comprises the following steps:
an initial imaging step wherein a first image of the region is determined by said processing unit and array,
an evaluation step in which a metric value is determined for pixels in the first image,
an imaging step in which, if the metric value is comprised in a first range, a pixel value in the image is computed without using a transmit weighted vector, and if the metric value is comprised in a second range different than said first range, a pixel value in the image is computed with using transmit weighting vectors, said transmit weighting vectors being different and orthogonal one to an other one.

According to an aspect of the method, the metric value is determined for distinguishing a pixel in the first image corresponding to a significant reflective signal from a pixel in the first image corresponding to a non-significant speckle signal.

According to an aspect of the method, the metric value is determined via a calculus of an autocorrelation function.

According to an aspect of the method, the metric value is a mean value of the autocorrelation function for lags comprised between 10 degrees and 30 degrees.

Another object of the invention is to provide an apparatus implementing said imaging method. Said apparatus for producing an image of a region inside a medium, comprises a processing unit connected to an array of transducers in relation with said medium, and wherein the array and the processing unit implements the flowing steps:
(a) a transmission step in which a first plurality (M) of waves are transmitted inside the medium by the transducers,
(b) a reception step in which a set of data is acquired by said transducers in response to the waves, and wherein the processing unit implements the following step:
(c) a beamforming step in which the set of data is processed by a second plurality of beamforming processes for providing beamformed pixel values of at least a portion of the image, each beamforming process either using a set of data corresponding to waves generated with a transmit weighting vector, or using a transmit weighting vector in the calculus of the beamformed pixel values, and
(d) a combining step in which the beamformed pixel values of said second plurality are combined together to provide a pixel value of each pixel in the image, and wherein the transmit weighting vectors are different and orthogonal one to an other one.

In various embodiments of the apparatus, one and/or other of the following features may optionally be incorporated.

According to an aspect of the apparatus, the transmit weighting vectors are applied during the beamforming step (c), and
during the beamforming step (c), the beamforming process is a synthetic beamforming in which the beamformed pixel values are calculated by the following formula:

$$U_n(x, z) = \sum_{m=1}^{M} W_{Tn}[m] \sum_{l=l1}^{l2} W_R[l] DS(k - \tau(x, z, l), l, m)$$

where
DS(k, l, m) is a matrix of the set of data,
$W_R$ is a receive weighting vector,
$\tau(x, z, l)$ is a delay function adapted for the beamforming process,
l is an index of a transducer in the array 2, comprised between l1 and l2, an aperture for beamforming a line,
m is the index, comprised between I and M, M being the first plurality that is the number of transmitted waves inside medium,
$W_{Tn}$ is the transmit weighting vector,
x, z are coordinates of a pixel inside the image.

According to an aspect of the apparatus, the synthetic beamforming process is chosen in a list comprising synthetic aperture focusing technique (SAFT) beamforming process, virtual transducer SAFT beamforming process, spatially coded SAFT beamforming process, circular wave synthetic beamforming process, plane wave synthetic beamforming process.

According to an aspect of the apparatus, it further implements the following steps:
an initial imaging step wherein a first image of the region is determined by said processing unit and array, and
an evaluation step in which a metric value is determined for pixels in the first image,
an imaging step in which, if the metric value is comprised in a first range, a pixel value in the image is computed without using a transmit weighted vector, and if the metric value is comprised in a second range different than said first range, a pixel value in the image is computed with using transmit weighting vectors, said transmit weighting vectors being different and orthogonal one to an other one.

Another object of the invention is to provide a computer program including instructions for executing the steps of the above imaging method when said program is executed by a computer.

Another object of the invention is to provide a computer-readable storage medium on which is stored computer program including instructions for execution of the steps of the above imaging method when said program is executed by a computer.

BRIEF DESCRIPTION OF THE DRAWINGS

Other features and advantages of the invention will be apparent from the following detailed description of two of its embodiments given by way of non-limiting example, with reference to the accompanying drawings. In the drawings.

MORE DETAILED DESCRIPTION

In the Figures, the same references denote identical or similar elements.

Figure 1:
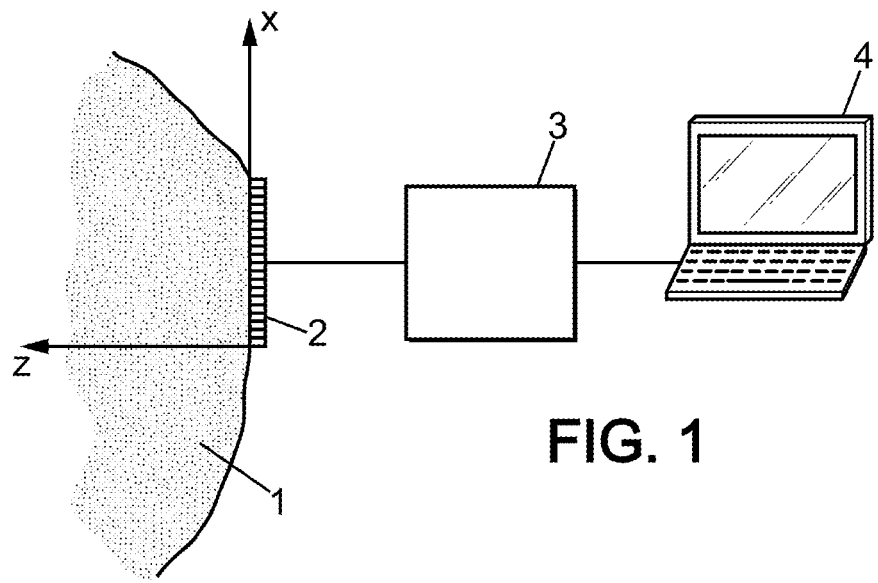
FIG. 1 is a schematic drawing showing an ultrasound imaging apparatus according to one embodiment of the invention.

The apparatus shown on FIG. 1 is adapted for imaging of a region 1, for instance living tissues and in particular human tissues of a patient. The apparatus may include for instance:

- a transducer array 2, for instance a linear array typically including a few tens of transducers (for instance 100 to 300) juxtaposed along an axis X (horizontal or array direction X) as already known in usual probes (the array 2 is then adapted to perform a bidimensional (2D) imaging of the region 1, but the array 2 could also be a bidimensional array adapted to perform a 3D imaging of the region 1);
- an electronic bay 3 controlling the transducer array and acquiring signals therefrom;
- a microcomputer 4 for controlling the electronic bay 3 and viewing images obtained from the electronic bay (in a variant, a single electronic device could fulfill all the functionalities of the electronic bay 3 and of the microcomputer 4).

The axis Z on FIG. 1 is an axis perpendicular to the axis X, and it is usually the direction of ultrasound beams generated by the transducers of the array. This direction is designated in present document as a vertical or axial direction.

The transducer array 2 may also be a convex array including a plurality of transducer aligned along a curved line.

Figure 2:
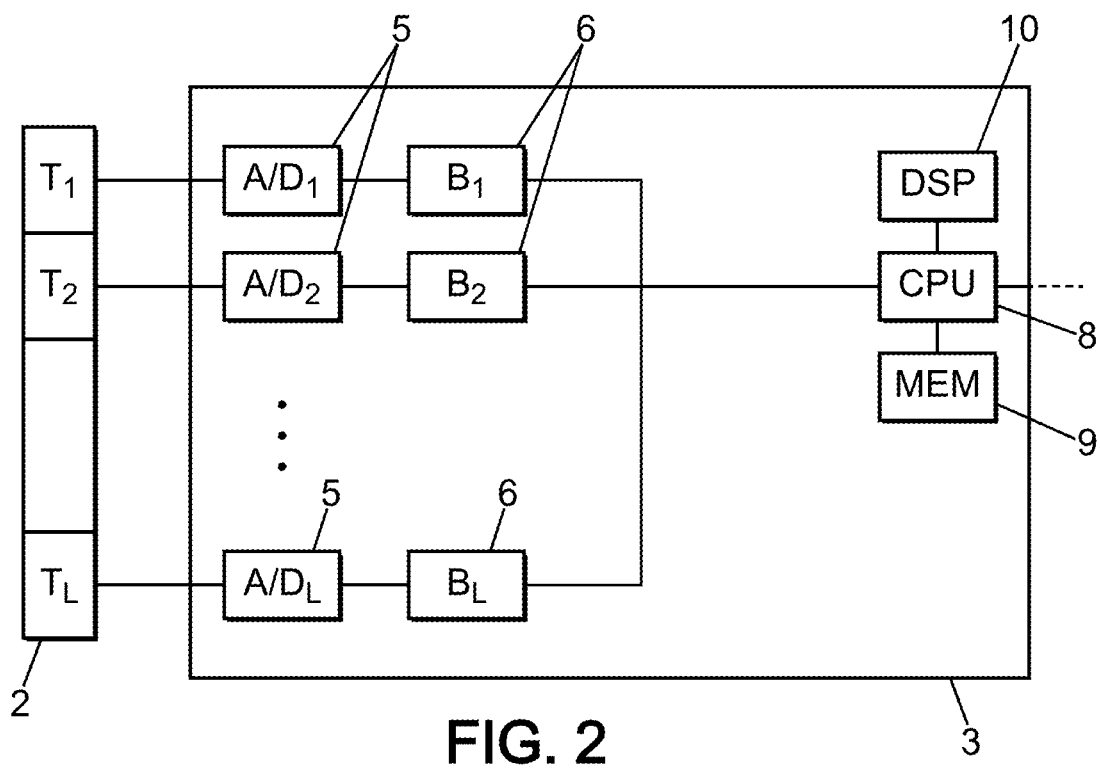
FIG. 2 is a block diagram showing part of the apparatus of FIG. 1.

As shown on FIG. 2, the electronic bay 3 may include for instance:

- L analog/digital converters 5 (A/D$_1$-A/D$_L$) individually connected to the L transducers (T1-TL) of the transducer array 2;
- L buffer memories 6 (B$_1$-B$_n$) respectively connected to the n analog/digital converters 5,
- a central processing unit 8 (CPU) communicating with the buffer memories 6 and the microcomputer 4,
- a memory 9 (MEM) connected to the central processing unit 8;
- a digital signal processor 10 (DSP) connected to the central processing unit 8.

The apparatus herein disclosed is a device for ultrasound imaging, the transducers are ultrasound transducers, and the implemented method is for producing ultrasound images of region 1.

However, the apparatus may be any imaging device using other waves than ultrasound waves (waves having a wavelength different than an ultrasound wavelength), the transducers and the electronic bay components being then adapted to said waves.

Figure 3:
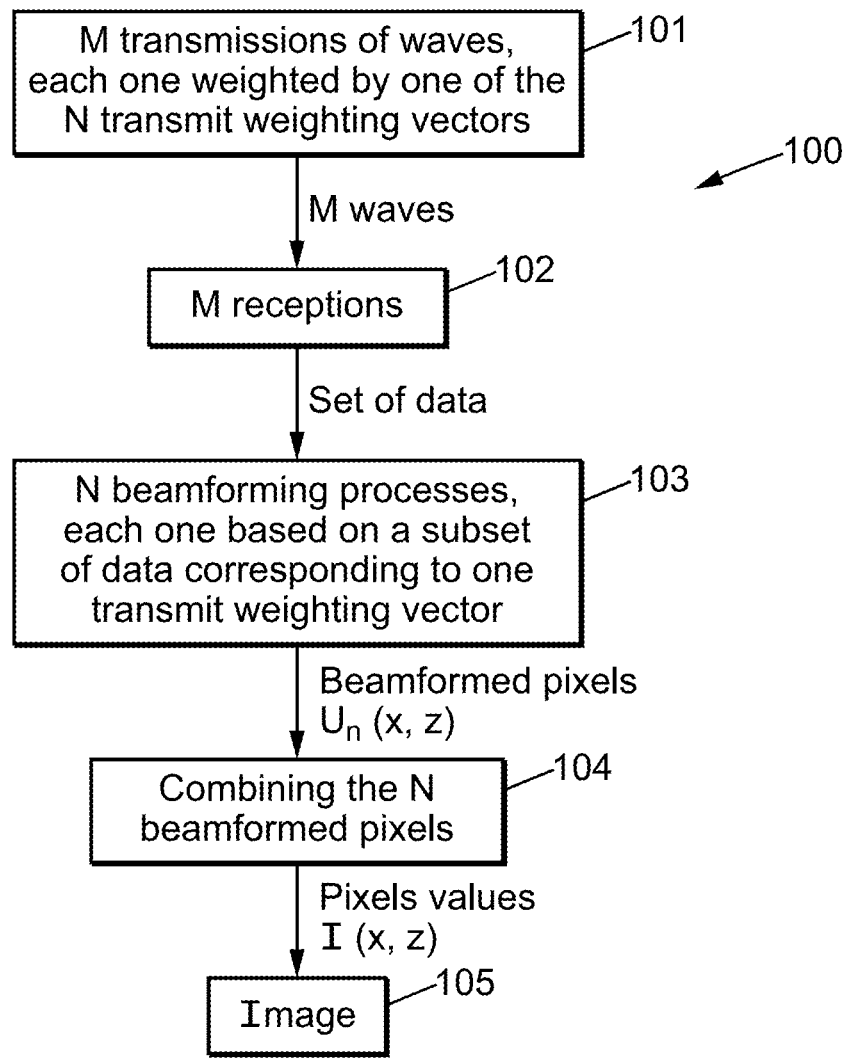
FIG. 3 is a diagram showing a first example of imaging method according to the invention and implemented in the apparatus of FIG. 1.
Figure 4:
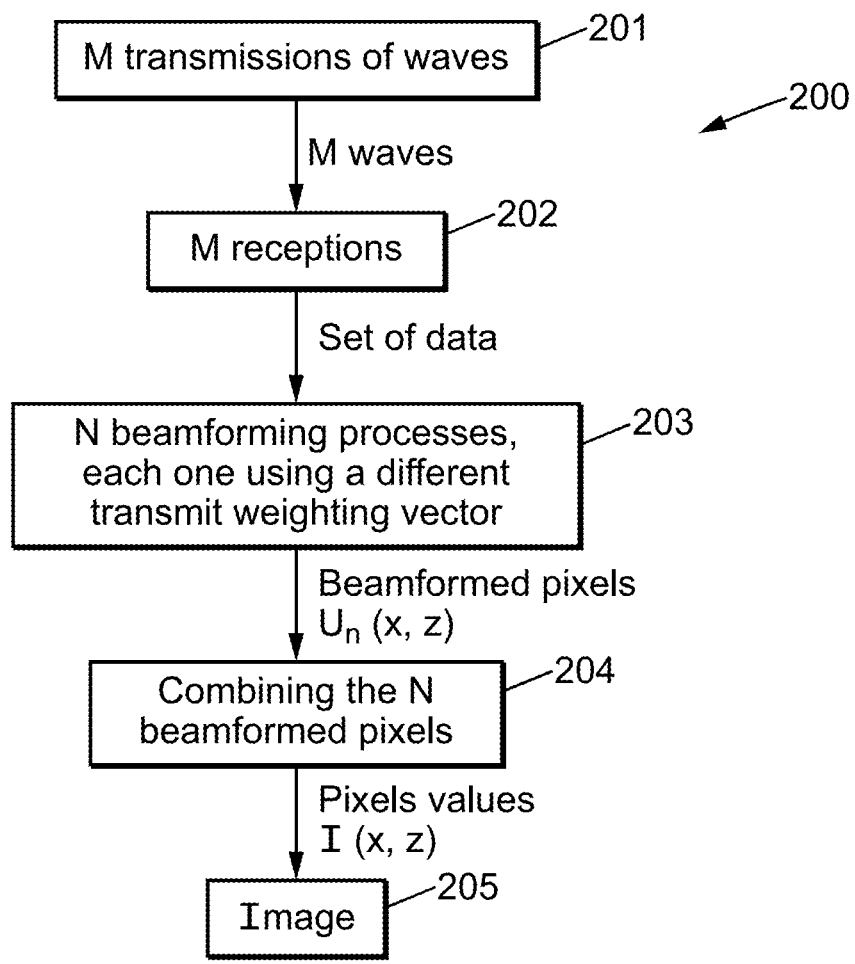
FIG. 4 is a diagram showing a second example of imaging method according to the invention and implemented in the apparatus of FIG. 1.

FIGS. 3 and 4 show two examples of implementation of the method with the apparatus of FIGS. 1 and 2. The method steps are controlled mainly by the central processing unit 8 eventually with the help of the digital signal processor 10, or any other means.

The method includes the following main steps:

(a) a transmission step (101; 201) in which a first plurality of waves are transmitted by the transducers inside the region of the medium;

(b) a reception step (102; 202) in which a set of data is acquired by said transducers in response to the waves;

(c) a beamforming step (103; 203) in which the set of data, that is acquired during the reception step, is processed by a second plurality of beamforming processes to provide a second plurality of beamformed pixel values $U_n(x, z)$ for at least a portion of the image, and (d) a combining step (104; 204) in which the N beamformed pixel values are combined to provide a pixel value of each pixel in the image.

The first plurality is the number of waves transmitted inside the region of the medium for processing the image. This is a number of successive firings of the transducers to generate said waves.

The second plurality is the number of transmit weighting vectors $W_{Tn}$ that is used in the method.

The method according the invention uses a second plurality (a number N) of transmit weighting vectors $W_{Tn}$, that are different one to an other one.

Moreover, the transmit weighting vectors $W_{Tn}$ used in the method are orthogonal one to an other one, i.e.:

for any indexes i, j belonging to I . . . N,
index i being different of index j $$W_{Ti}.W_{Tj} = 0.$$

$$\text{i.e.: } \sum_{l=1}^{L} W_{Ti}(l).W_{Tj}(l) = 0$$

The transmit weighting vector $W_{Tn}$ is a vector comprising a number of L components, each component corresponding to an amplification coefficient to be applied to the signal that is usually sent to a transducer of the array 2 during the transmission step (a). The components of transmit weighting vectors $W_{Tn}$ can be defined to be values lower or equal to one:

$$W_{Tn}(l) <= 1, \text{ for } l=1 \text{ to } L.$$

According to a first variant illustrated on FIG. 3, the transmit weighting vector is applied on the transmitted waves during the transmission step a) (101) so as to provide a set of data comprising data corresponding to the plurality of transmit weighting vectors.

Then, this set of data is used during the beamforming step c), each beamforming process of this step using data corresponding to a specific transmit weighting vector (a specific transmission wave).

In this first variant, the amplitude wave transmitted in the medium may be small because of weighting effect of each transmit weighting vector, and therefore signal to noise ratio of the received set of data may be low. Additionally, this first variant requires MxN transmissions and acquisitions of waves, and therefore, it also lowers the imaging frame rate. Furthermore, it generates an image having a speckle noise that is not optimal into the overall scanned region as it is only adapted to the beam focal depth.

According to a second variant illustrated on FIG. 4, the transmit weighting vector is applied on the set of data (not weighted) inside the calculus of each beamforming process during the beamforming step (c) (203).

In that case, the weighting effect of first variant is obtained by an appropriate calculus (summation) during the beamforming step (c) (203), said calculus using a transmit-receive beamforming formula for each beamforming process.

In this second variant, the wave is transmitted inside the medium with unit amplification coefficients (except coefficients concerning windowing or aperture). The transmit weighting coefficients are only applied by calculation on the set of data acquired during the reception step (b).

Thanks to this transmit-receive beamforming process, the amplitudes of waves that are really transmitted inside the medium are not decreased, and the signal to noise ration (SNR) of the received signals digitized into the set of data is preserved.

In all variants of the method, the transducer array 2 is put into contact with the medium to be imaged (e.g. a patient's body).

The number of the transmitted waves may be comprised for instance between 2 and 100. The frequency of the ultrasound waves may be comprised for instance between 0.5 and 100 MHz, for instance between 1 and 10 MHz.

The number N of transmit weighting vectors $W_{Tn}$ is for instance a small number, for instance comprised between 2 and 10, and for example N=3. There are lots of orthogonal functions that can be used to determined such transmit weighting vectors $W_{Tn}$.

Figure 5A:
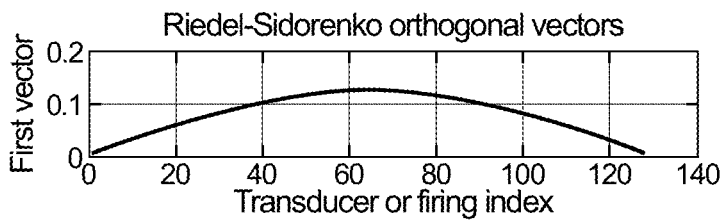
FIGS. 5a to 5c are first examples of three transmit weighting vectors that are orthogonal one to another one, said vectors corresponding to Riedel-Sidorenko functions.
Figure 5B:
Figure 5C:
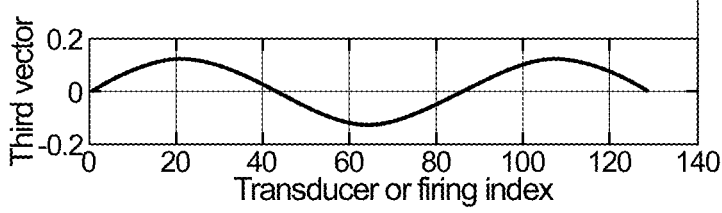

FIGS. 5a to 5c show a first example of 3 transmit weighting vectors $W_{Tn}$. In these figures, the abscissa is a transducer index, and the ordinate is the value of the component in each vector.

These transmit weighting vectors $W_{T1-3}$ are vectors of Riedel-Sidorenko functions that are orthogonal one to an other one.

Figure 6A:
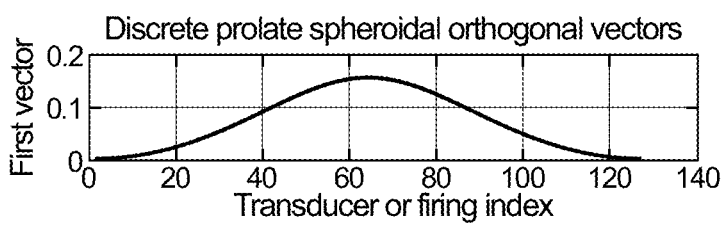
FIGS. 6a to 6c are second examples of three transmit weighting vectors that are orthogonal one to another one, said vectors corresponding to Discrete prolate spheroidal functions.
Figure 6B:
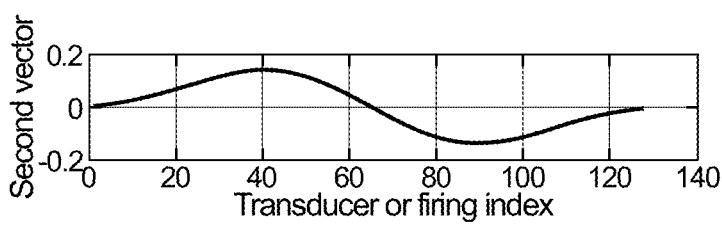
Figure 6C:
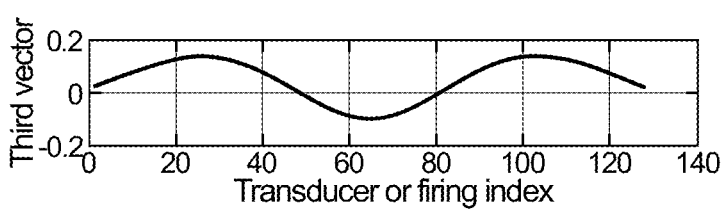

FIGS. 6a to 6c show a second example of 3 transmit weighting vectors $W_{Tn}$ using Discrete prolate spheroidal functions, also orthogonal one to an other one.

Figure 7A:
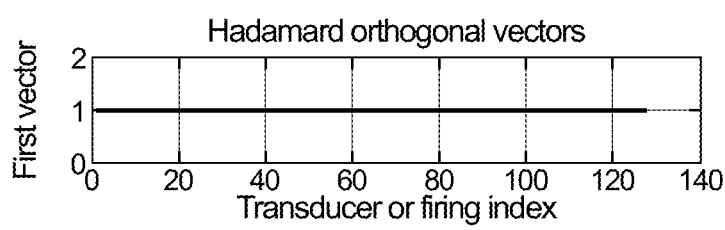
FIGS. 7a to 7c are third examples of three transmit weighting vectors that are orthogonal one to another one, said vectors corresponding to Hadamard functions.
Figure 7B:
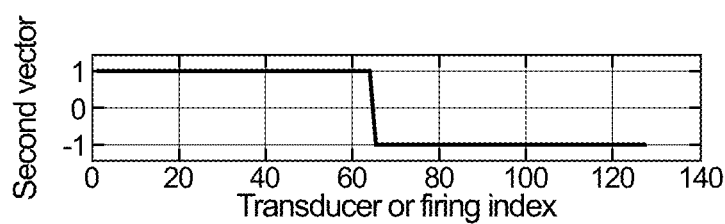
Figure 7C:
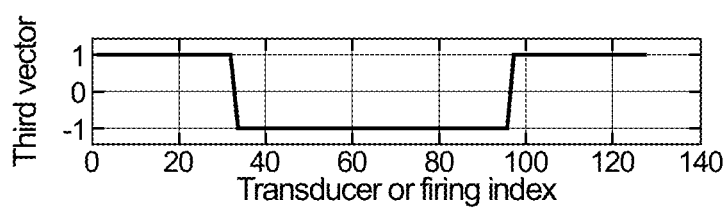

FIGS. 7a to 7c show a second example of 3 transmit weighting vectors $W_{Tn}$ using Hadamard functions, also orthogonal one to an other one.

The number N of transmit weighting vectors is preferably lower or equal to the number waves transmitted into the medium (the first plurality).

Demonstration Concerning the Effect of the Invention

Thanks to the use of orthogonal transmit weighting vectors, the speckle noise in the image is smoothed, because each transmit vector generates an uncorrelated speckle.

This can be mathematically proved. We use in this section, the formalism and notations used in the document "The van Cittert-Zernike theorem in pulse echo measurements", Raoul Mallart and Mathias Fink, J. Acoust. Soc. Am. 90(5), November 1991.

The incident pressure field at point $X_1$ and at frequency f is given by:

$$H_k(X_1, f) = \int\int\int_O O_k(X) \frac{\exp\left(\frac{j2\pi fr}{c}\right)}{r} dX$$

where
O(X) is the transmit aperture function of a focused aperture; and
$X=(x, y, 0)$, where x, y are coordinates in the image.

The goal of this section is to show that orthogonal transmit apertures $O_k(X)$ and $O_l(X)$ produce uncorrelated speckle patterns. The pressure field scattered by an individual scatterer located at point $X_1$ is a spherical wave.

The received pressure field at point $X_0$ is expressed as:

$$P_k(X_0, X_1, f) = \chi(X_1, f) H_k(X_1, f) \frac{\exp(j2\pi fr_{01}/c)}{r_{01}}$$

where $r_{01} = |X_0 - X_1|$.

The assumption is made that the scattering medium is incoherent, i.e., its structure is random and finer than the smallest wavelength used by the imaging system. The medium is unresolved and the autocorrelation of its scattering function $R_M$ is of the form:

$$R_M(X_1-X_2, f) = \Psi(X, f)\delta(X_1-X_2)$$

where X is the local scattering coefficient in the neighbourhood of the point coordinate (x, z).

The pressured field backscattered from the whole medium in response to a Dirac pulse sensed at point $X_0$ is given by:

$$P_k(X_0, f) = \int\int\int_V \chi(X_1, f) H_k(X_1, f) \frac{\exp(j2\pi fr_{01}/c)}{r_{01}} d^3X_1.$$

The cross-correlation $R_{kl}(X_0, f)$ of the pressure fields $P_k(X_0, f)$ and $P_l(X_0, f)$ is given by:

$$R_{kl}(X_0, f) = E\{P_k(X_0, f) P_l(X_0, f)\}$$

where
E{.} denotes mathematical expectation.

One can express the product $P_k(X_0, f) \cdot P_l(X_0, f)$ with the above equations, as:

$$P_k(X_0, f) P_l(X_0, f) =$$

$$\int\int\int_V \int\int\int_V \chi(X_1, f)\chi^*(X_2, f) H_k(X_1, f) H_l^*(X_1, f)$$

$$\frac{\exp(j2\pi f(r_{01}-r_{02})/c)}{r_{01}r_{02}} d^3X_1 d^3X_2$$

With the above equations, it can be derived that:

$$R_{kl}(X_0, f) = \chi_0(f) \int\int\int_V \int\int\int_V \delta(X_1 - X_2) H_k(X_1, f)$$

$$H_l^*(X_1, f) \ldots \frac{\exp(j2\pi f(r_{01} - r_{02})/c)}{r_{01} r_{02}} d^3X_1 d^3X_2$$

Thus the cross-correlation of the pressure fields $P_k(X_0, f)$ and $P_l(X_0, f)$ is given by:

$$R_{kl}(X_0, f) = \chi_0(f) \iiint_V H_k(X_1, f) H_l^*(X_1, f) d^3X_1$$

From the above cited publication of Mallart et al., the incident pressure field at point $X_1$ is then approximately:

$$H_k(X_1, f) = \varphi_k \int\int_O O_k(x) \exp\left(\frac{j\pi f}{zc} x.x\right) \exp\left(\frac{j\pi f}{zc} x.X_1\right) d^2x$$

Where $\varphi_k$ is a phase term.

For an aperture focusing at depth z, the aperture function $O(x)$ contains the phase term $$\exp\left(-\frac{j\pi f}{zc} x.x\right),$$

thus $$O_k(x) \exp\left(\frac{j\pi f}{zc} x.x\right)$$

is a real value.

Let $$\widetilde{O_k}(x) \triangleq O_k(x) \exp\left(\frac{j\pi f}{zc} x.x\right),$$

the product of incident fields is expressed as:

$$H_k(X_1, f) H_l^*(X_1, f) =$$

$$\varphi_k \int\int_O \int\int_O \widetilde{O_k}(x_1) \widetilde{O_l^*}(x_2) \ldots \exp\left(\frac{j\pi f}{zc}(x_1 - x_2).X_1\right) dx_1^2 dx_2^2$$

And, injecting the last equation in the previous one, one can derive that:

$$R_{kl}(X_0, f) = \chi_0(f) \varphi_k \varphi_l^* \int\int_O \int\int_O \widetilde{O_k}(x_1) \widetilde{O_l^*}(x_2) \int\int\int_V \exp\left(\frac{j\pi f}{zc}(x_1 - x_2).X_1\right) d^3X_1 d^2x_1 d^2x_2$$

$$= \chi_0(f) \varphi_k \varphi_l^* \int\int_O \int\int_O \widetilde{O_k}(x_1) \widetilde{O_l}(x_2) \, \delta(x_1 - x_2) d^2x_1 d^2x_2$$

$$= \chi_0(f) \varphi_k \varphi_l^* \int\int_O \widetilde{O_k}(x_1) \widetilde{O_l}(x_1) d^2x_1$$

The above equation shows that, orthogonal apertures, i.e. $\widetilde{O_k}(x_1), \widetilde{O_k}(x_1)$ that are so that $\iint_O \widetilde{O_k}(x_1) \widetilde{O_k}(x_1) = 0$, yields to uncorrelated acquired data, i.e. $R_{kl}(X_0, f) = 0$.

Therefore, the cross-correlation of the pressure fields is null, and the speckle noise is uncorrelated.

Consequently, the method of the invention leads to a reduced speckle noise compared to prior art method. In fact, the speckle noise according to the method is minimal.

The method of the invention may be applied to any ultrasound imaging method. The following description will explains some of them.

Example 1: Conventional Imaging

A first example corresponding to a conventional imaging method, usually called conventional focussing aperture or conventional B-mode imaging, is now explained.

During the transmission step (a), a number of M waves are successively transmitted into the region by the transducers. These waves are focused beams transmitted inside the medium according to a vertical direction (Z) substantially perpendicular to the array direction (X), and focused at a focal distance (or focal depth) from the transducer array 2.

The M successive focused beams are moved transversally one to an other according to a lateral direction corresponding to the array direction (X), so as to scan the region.

According to the present invention, each focused beam is also repeated N times, i.e. one focussed beam for each transmit weighting vector $W_{Tn}$ of index n. The transmit weighting vector $W_{Tn}$ are directly applied to the transducers: Each component of index l of the transmit weighting vector is used for amplifying or reducing the signal sent to the transducer of index l of the array 2.

In this first example, the first plurality (the number of waves transmitted inside the medium) is therefore equal to M×N.

Each wave propagates inside the region, where it interacts with diffusing particles which are reflective for the ultrasound waves. A wave is then backscattered as a reflexion wave (comprising echoes) towards the transducer array 2.

During the reception step (b), each reflexion wave is received by the transducers, acquired or converted into data by an analog to digital converter, and stored into a memory. Then, all the reflexion waves are all stored into the memory as a set or group of data.

The set of data from the acquired waves can be organized as a matrix DS(k, l, m), where k is an index of a sample over time, l is an index of transducer among the array, m is an index of the transmission wave among the number of M×N fired or transmitted waves (the number corresponding to the first plurality).

During the beamforming step (c), one or several lines (vertical lines or axial lines) of an image are calculated by a beamforming process. These lines are parallel to the vertical or axial direction Z (direction of the focused beam), and are included inside the focused beam.

For each one of the N transmit weighting vectors $W_{T_n}$, beamformed pixel values $U_n(x, z)$ of the pixels inside the lines can be calculated by the following beamforming formula, corresponding to a receive beamforming:

$$U_n(x, z) = \sum_{l=l1}^{l2} W_R[l]DS(k - \tau(x, z, l), l, m)$$

where
DS(k, l, m) is a matrix storing all the set of data,
$W_R$ is a receive weighting vector,
$\tau(x, z, l)$ is a delay function for the beamforming process, i.e. corresponding to the present conventional beamforming process,
l is an index of a transducer in the array 2, comprised between l1 and l2, an aperture for beamforming a line,
m is an index pointing to a unique or determined transmit weighting vector $W_{T_n}$ of index n and corresponding to a beam focussed near a point having coordinates (x, z) inside the medium, and x, z are coordinates of a pixel inside the image.

During the combining step (d), the N (second plurality) beamformed pixel values $U_n(x, z)$ are computed for each transmit weighting vector, and are combined to provide a pixel value I(x, z) of each pixel inside the image.

Then, the pixel value I(x, z) can be calculated by the following sum formula:

$$I(x, z) = \sum_{n=1}^{N} |U_n(x, z) + iHT\{U_n(x, z)\}|^2$$

wherein
i is the complex unit imaginary number.
n is the index, comprised between I and N, N being the number of transmit weighting vectors in the second plurality,
|X| is the modulus of X,
HT{X} is the Hilbert transform of X,
$U_n(x, z)$ is the beamformed pixel value for index n.
Unfortunately, the above method:
requires M×N transmission and acquisition of waves, and therefore the steps a) and b) may take some time,
generates an image having a speckle noise that is not optimal into the overall scanned region, as it is only adapted to the beam focal depth.

Example 2 Synthetic Imaging

A second example corresponding to a synthetic imaging method is now explained.

As synthetic imaging method, it should be understand any method known synthetic method, and at least any method of following list:
1) Synthetic aperture focusing technique method (SAFT),
2) Virtual transducer SAFT method,
3) Spatial coded SAFT method,
4) Circular wave synthetic method, and
5) Plane wave synthetic method.
1) The SAFT method is for example detailed in published document of J. A. Jensen, S. I. Nikolov, K. L. Gammelmark, M. H. Pedersen, "Synthetic Aperture Ultrasound Imaging", Ultrasonics 44, e5-e15, 2006.

This method implements:
a transmission step (a) wherein at least one transmission of a wave is done (fired) for each transducer of the array 2: Each transducer of the array 2 is excited one after an other one, and
a reception step (b) wherein all the transducers signals are acquired, recorded (stored) into memory as a set of data.

The set of data can also be organized as a matrix DS(k, l, m), usually called the "full data set", where
k is an index of a sample over time,
l is an index of transducer among the array,
m is an index of the transmission wave among the number of fired waves (the number corresponding to the first plurality).

Therefore, the number M of fired waves is usually equal to the number L of transducers in the array 2. However, this number can be lower than this number L of transducers if not using all the transducers of the array, or it can be higher than the number L of transducers if doing averaging for some of them.

Then, the beamforming step (c) and combining step (d) differs from the known SAFT method, and are explained bellow.

During the beamforming step (c), the beamformed pixel values $U_n(x,z)$ can be calculated by the following beamforming formula comprising a double summation (one for the number of used transducers having index l, and one for the number of transmitted waves having index m):

$$U_n(x, z) = \sum_{m=1}^{M} W_{T_n}[m] \sum_{l=l1}^{l2} W_R[l]DS(k - \tau(x, z, l, m), l, m)$$

where
DS(k, l, m) is a matrix of the sets of data,
$W_R$ is a receive weighting vector,
$\tau(x, z, l)$ is a delay function for the beamforming process, i.e. corresponding to the present SAFT beamforming process,
l is an index of a transducer in the array 2, comprised between l1 and l2, an aperture for beamforming a line,
m is the index, comprised between I and M, M being the first plurality that is the number of transmitted waves inside medium,
$W_{T_n}$ is a transmit weighting vector of index n,
x, z are coordinates of a pixel inside the image.

During the combining step (d), the beamformed pixel values $U_n(x, z)$ calculated for all the number N (second plurality) of transmit weighting vectors are also combined to provide a pixel value I(x, z) of each pixel inside the image.

Then, the pixel value I(x, z) can be also calculated by the same sum formula as disclosed above:

$$I(x, z) = \sum_{n=1}^{N} |U_n(x, z) + iHT\{U_n(x, z)\}|^2.$$

The transmit weighting vectors $W_T$ being applied by calculus during the beamforming step (c), this method do not need additional firings (transmission of waves into the medium).

The image produced with SAFT method is usually of a high quality inside the entire region that is scanned: good resolution and good contrast. The signal to noise ratio (SNR) is not optimal, because each firing uses only one transduced of the array, and the firing energy is low compared to other methods.

Thanks to the orthogonal transmit weighting vectors $W_{Tn}$, the above modified SAFT method is able to reduce the image speckle noise.

2) The Virtual transducer SAFT method improves the SAFT method in terms of signal to noise ratio. This method is for example disclosed in published document of J. Kortbek, J. A. Jensen, K. L. Gammelmark, "Synthetic Aperture Sequential Beamforming", IEEE International Ultrasonics Symposium Proceedings, p. 966-969, 2008.

Compared to the previous SAFT method, the transmission waves are not generated by only one transducer of the array, but by a plurality of transducers of the array so that the transmission wave is a focused beam focused to a predetermined focal zone inside the region.

Then, in this virtual transducer SAFT method:
during the transmission step (a), a plurality of transmission waves, each one corresponding to focused beam to a focal zone inside the region is transmitted by a plurality of transducers, and
during the reception step (b), the set of data is acquired for a plurality of focal zones, and the set of data can be organized as a matrix DS(k, l, m), usually called the "full data set" equivalent to the one of the SAFT method.

Then, the beamforming step (c) and the combining step (d) of present invention are applied to the Virtual transducer SAFT method and are identical or similar to those applied for the above modified SAFT method.

Thanks to this modified virtual transducer SAFT method, using a second plurality of transmit weighting vectors $W_{Tn}$, the produced image has a reduced speckle noise.

3) The spatially coded SAFT method also improves the SAFT method in terms of signal to noise ratio.

In this method,
during the transmission step (a), a wave is fired by applying a transmission matrix TM to the transducers signals of the SAFT method: For each one of the M transmission waves (the first plurality), the signals to the transducers are multiplied by the transmission matrix TM, said transmission matrix being an invertible matrix, and
during the reception step (b), the set of data acquired in response to the transmission waves is stored into a receive matrix RM(k, l, m) and the matrix of the set of data DS(k, l, m) can be obtained by using the receive matrix RM and the transmission matrix TM by the following inversion formula:

$DS(k,l,m)|_{k=constant} = TM^{-1} \cdot RM(k,l,m)|_{k=constant}$, for k=1 to K.

The matrix DS of the set of data is then equivalent to the same one above described in the SAFT method.

Then, the beamforming step (c) and the combining step (d) of present invention is applied to the spatially coded SAFT method, and are similar to those applied for the above modified SAFT method.

Thanks to this modified spatially coded SAFT method, using a second plurality of transmit weighting vectors $W_{Tn}$, the produced image has a reduced speckle noise.

4) The circular wave synthetic method also improves the SAFT method in terms of signal to noise ratio. It is also similar to the virtual transducer SAFT method, but differs in that the focussed beam is focussed behind the array, which leads to circular waves transmitted inside the medium.

Details of this method can be found in the published document M. Couade, M. Pernot, M. Tanter, E. Messas, A. Bel, M. Ba, A.-A. Hagege, M. Fink, "Ultrafast Imaging of the Heart Using Circular Wave Synthetic Imaging with Phased Arrays", IEEE Ultrason. Symposium, pp. 515-518, 2009.

Then, the beamforming step (c) and the combining step (d) of present invention applied to this circular wave synthetic method are identical or similar to those applied for the above modified SAFT method.

Thanks to this modified circular wave synthetic method, using a second plurality of transmit weighting vectors $W_{Tn}$, the produced image has a reduced speckle noise.

5) The plane wave synthetic method also improves the SAFT method in terms of signal to noise ratio.

Details of this method can be found in the published U.S. Pat. No. 6,551,246 or published patent application US 2009/0234230.

In this method:
during the transmission step (a), a first plurality (M) of plane waves is fired into the medium, and
during the reception step (b), the transducers signals are acquired, recorded (stored) into a memory as a matrix DS(k, l, m) of the set of data, m being the index of the transmitted plane wave into the medium.

Therefore, the method differs from the SAFT method in that a number M of plane waves is transmitted (emitted, fired) inside the medium.

Then, the beamforming step (c) and the combining step (d) of present invention are applied to this plane wave synthetic method, and are identical or similar to those applied for the above modified SAFT method.

During the beamforming step (c), the beamformed pixel values $U_n(x, z)$ can be calculated by the following beamforming formula:

$$U_n(x, z) = \sum_{m=1}^{M} W_{Tn}[m] \sum_{l=l1}^{l2} W_R[l] DS(k - \tau(x, z, l, m), l, m).$$

In the plane wave synthetic method, each plane wave is weighted by a different transmit weighting vector $W_{Tn}$.

In all the above beamforming process, the delay function $\tau(x, z, l, m)$ is a well known function depending on each type of beamforming process and each type of probe (shape, dimension).

Figure 8:
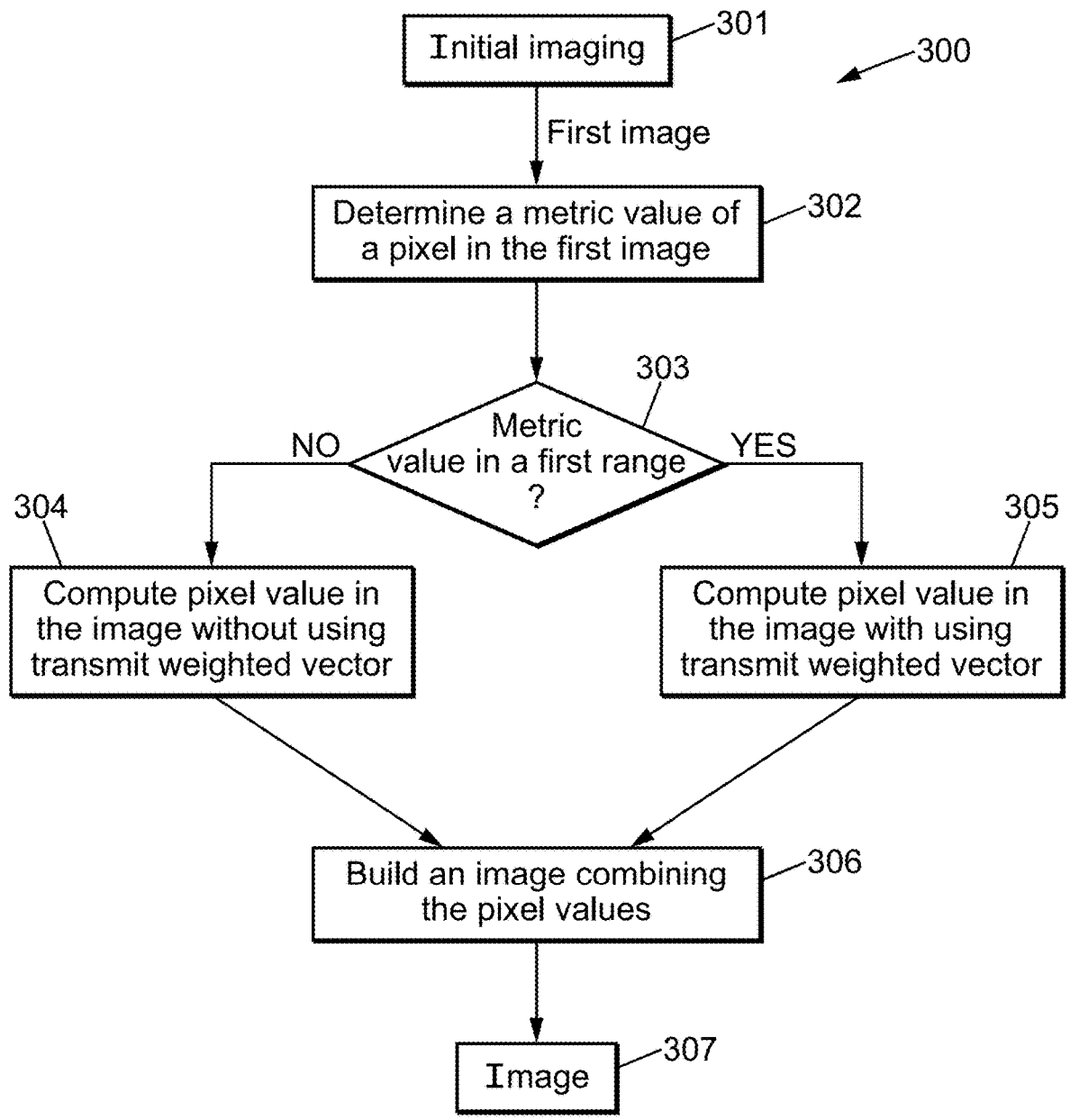
FIG. 8 is a third example of imaging method according to the invention, said third example being an adaptive method.

According to a third variant of the imaging method, illustrated on FIG. 8, the imaging method is not using a plurality of transmit weighting vectors for all pixels in the image. Thanks to this feature lateral resolution is not reduced for these pixels (without transmit weighting vectors compounding), and speckle noise is reduced for the other pixels in the image (with transmit weighting vectors compounding).

In this third variant, the imaging method further comprises the following steps.
an initial imaging step (301) wherein a first image of the region is determined by said processing unit and array,
an evaluation step (302) in which a metric value is determined for the pixels inside the first image,
an imaging step (303, 304, 305) in which, if the metric value is comprised in a first range, a pixel value in the image is computed directly without using a plurality of transmit weighted vectors, and if the metric value is comprised in a second range different than said first range, a pixel value in the image is computed with using a plurality (second plurality, N) of transmit weighting vectors, said transmit weighting vectors being different and orthogonal one to an other one in the (second) plurality.

Then, the imaging method can build the final image 307 by combining the pixels computed in the imaging steps (303, 304, 305). The final image pixel value is eighter calculated at step 304 without using transmit weighting vectors, or at step 305 with using transmit weighting vectors according to one of the above explained methods.

Advantageously, the metric value is determined for distinguishing a pixel in the first image corresponding to a significant reflective signal from a pixel in the first image corresponding to a non-significant speckle signal. A significant reflective signal from a pixel in the first image is usually a pixel corresponding to a location inside the medium having a strong reflector element. In that case, the imaging method does not use transmit weighting vectors that reduces lateral resolution. A non-significant speckle signal from a pixel in the first image is usually a pixel corresponding to a location inside the medium not having a strong reflector element. This location corresponds to a speckle noise location in the image. In that case, the imaging method can use transmit weighting vectors that reduces said speckle noise that is not satisfying for the user and that is not significant.

Figure 9:
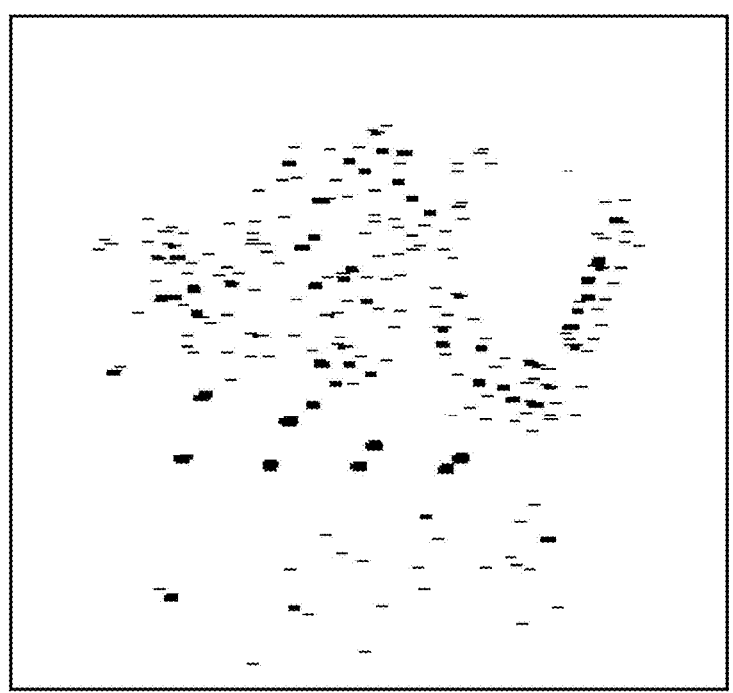
FIG. 9 shows an example of a decision image computed for a sample and corresponding to metric evaluation decisions in the method of FIG. 8.
Figure 9:
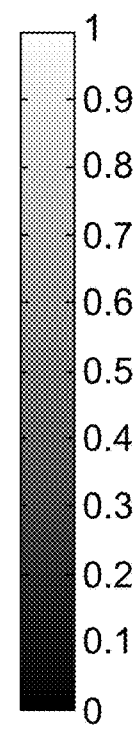
Figure 10:
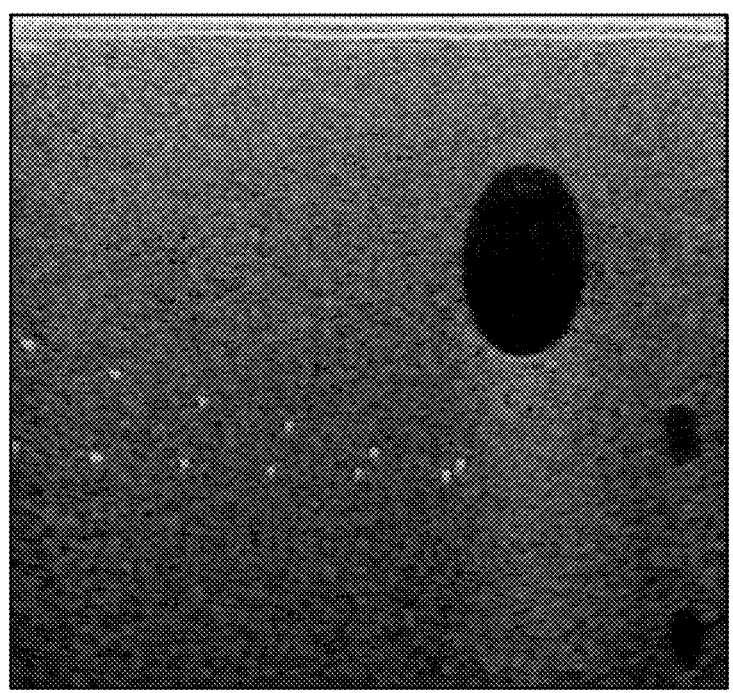
FIG. 10 shows an example of an image computed for the same sample as in FIG. 9.
Figure 10:
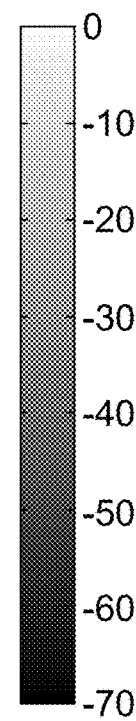

FIGS. 9 and 10 are an example of images generated by the third variant of imaging method. FIG. 9 is a binary image 303 in which black pixels are pixels without transmit weighting (step 304 of the method) and white pixels are pixels with transmit weighting (step 305 of the method). FIG. 10 is the final image provided by the third variant imaging method 300.

Thanks to the above hybrid adaptive method, this image 307 is an image having an reduced speckle noise and a good lateral resolution.

The metric value can be determined via a calculus of an autocorrelation function $R(\theta, x, z)$.

For example, the autocorrelation function may be determined by:

$$R(\theta,x,z)=E\{I_{m1}(x,z)\cdot I_{m2}(x,z)\}$$

where $E\{\ \}$ is a mathematical expected value, and $$I_m(x,z) = |V_m(x,z) + iHT\{V_m(x,z)\}|^2$$

$$V_m(x,z) = \sum_{l=l1}^{l2} W_R[l]DS(k - \tau(x,z,l,m), l, m)$$

DS(k l, m) is a matrix of the sets of data,
k is an index over time,
l is an index of a transducer among the array,
m is an index of a transmitted wave (e.g. plane wave) for synthetic beamforming,
$W_R$ is a receive weighting vector,
$\tau(x, z, l, m)$ is a delay function for the beamforming process, e.g. corresponding to plane wave beamforming process.

The lag $\theta$ is an angle that is a difference between a first angle corresponding to a first firing of index m1 and a second angle corresponding to a second firing of index m2.

The first and second firings are plane wave firings and the first and second angles are angles of said plane waves relative to the array of transducers.

Figure 11:
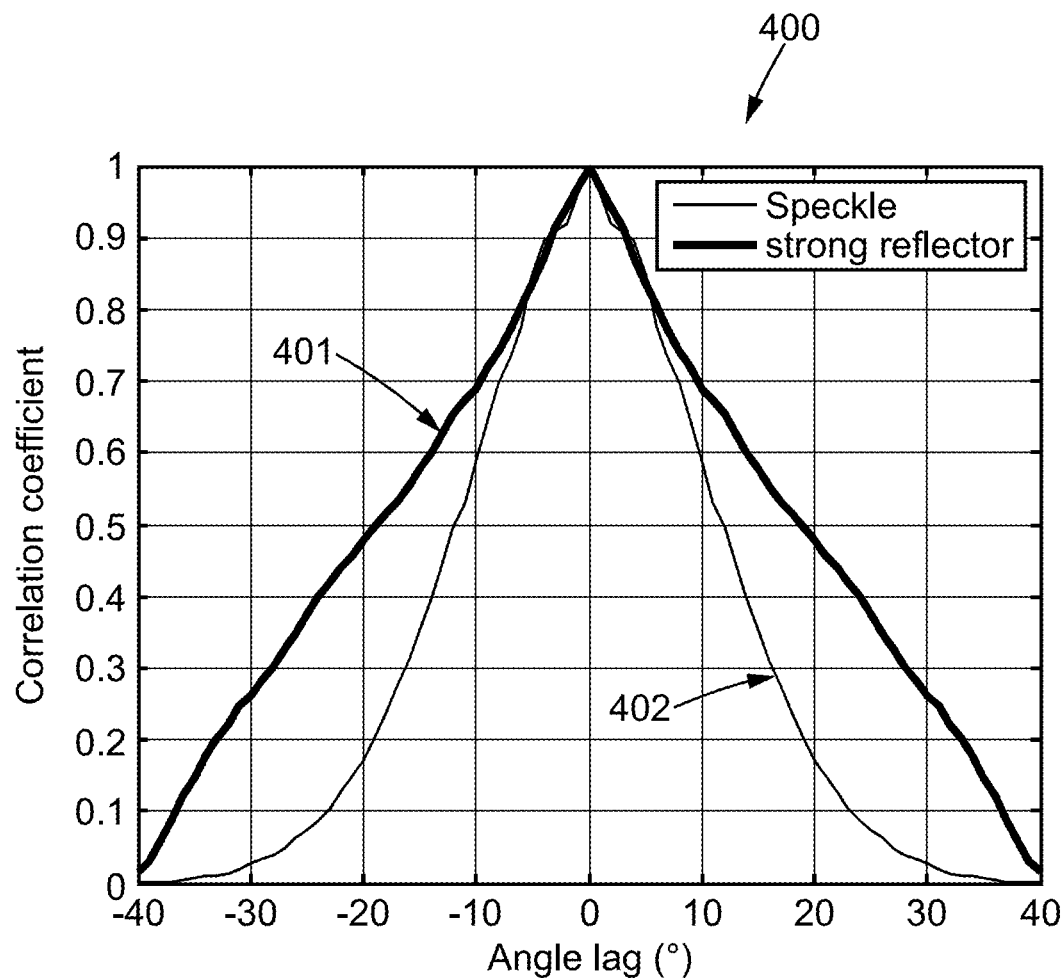
FIG. 11 shows an example of autocorrelation function used in the third example of imaging method of FIG. 8.

FIG. 11 is showing two examples of such autocorrelation functions: a first autocorrelation function curve 401 established at a location inside the medium corresponding to a strong reflector, and a second autocorrelation function 402 established at a location inside the medium corresponding to speckle noise.

The two autocorrelation functions 401, 402 differ in a lag range comprised between 10 degrees and 30 degrees. This difference may be used to distinguish between the two types of pixels in the first image, and to choose (step 303) between the use or not use (steps 304, 305) of the transmit weighting vectors for computing or calculating a pixel of the final image of the imaging method.

The invention claimed is:

1. An imaging method for producing an image of a region inside a medium, the imaging method being implemented by a processor connected to an array of transducers in relation with said medium, said method comprising:
   transmitting a plurality of waves inside the medium by the transducers;
   acquiring a set of data by said transducers in response to the transmitted plurality of waves;
   beamform processing the set of data by a plurality of beamforming processes providing beamformed pixel values $U_n(x, z)$ of at least a portion of the image, each of the beamforming processes using a transmit weighting vector $W_{Tn}$ in calculating the beamformed pixel values;
   combining the calculated beamformed pixel values together to provide a pixel value $I(x, z)$ of each of a plurality of pixels inside the image,
   wherein the transmit weighting vectors $W_{Tn}$ are different and orthogonal with respect to each other, each of the transmit weighting vectors $W_{Tn}$ generating uncorrelated speckle noise, a transmit weighting vector of index i being orthogonal to a transmit weighting vector of index j, index i being different of index j, and $$\sum_{l=1}^{L} W_{Ti}(l).W_{Tj}(l) = 0$$

that is a dot product, L being the number of components of the transmit weighting vectors $W_{Tn}$,
   wherein the transmit weighting vectors $W_{Tn}$ are applied during the beamform processing, during the beamform processing, each of the beamforming processes is a synthetic beamforming in which the beamformed pixel values $U_n(x, z)$ are calculated by the following formula:

$$U_n(x,z) = \sum_{m=1}^{M} W_{Tn}[m] \sum_{l=l1}^{l2} W_R[l]DS(k - \tau(x,z,l,m), l, m)$$

where
   DS(k, l, m) is a matrix of the set of data,
   $W_R$ is a receive weighting vector,
   $\tau(x, z, l)$ is a delay function adapted for the beamforming process,
   k is an index of a sample over time, l is an index of a transducer in the array, comprised between l1 and l2, an aperture to beamform a line, m is the index, comprised between 1 and M, M being the number of transmitted waves inside the medium, n is the index, comprised between one and N, N being the number of transmit weighting vectors, $W_{Tn}$ is the transmit weighting vector, x, z are coordinates of a pixel inside the image, and the receive weighting vector and the transmit weighting vector being computational vectors; and computing the image, wherein the transmit weighting vectors $W_{Tn}$ smoothen the speckle noise in the image.

2. The method according to claim 1, wherein the synthetic beamforming process is one of a synthetic aperture focusing technique (SAFT) beamforming process, a virtual transducer SAFT beamforming process, a spatially coded SAFT beamforming process, a circular wave synthetic beamforming process, and a plane wave synthetic beamforming process.

3. The method according to claim 1, wherein the pixel values I(x,z) of the image are calculated during the combining by the following formula:

$$I(x, z) = \sum_{n=1}^{N} |U_n(x, z) + iHT\{U_n(x, z)\}|^2$$

wherein
i is the complex unit imaginary number,
$|U_n(x,z)+iHT\{U_n(x,z)\}|$ is the absolute value of $U_n(x,z)+iHT\{U_n(x,z)\}$,
$HT(U_n(x,z))$ is the Hilbert transform of $U_n(x,z)$,
$U_n(x,z)$ is the beamformed pixel value of the plurality of beamforming processes.

4. The method according to claim 1, wherein the transmit weighting vectors $W_{Tn}$ are determined by an orthogonal function that is one of a Riedel-Sidorenko function and a Hadamard function.

5. The method according to claim 1, wherein the transducers are ultrasound transducers that transmit or receive ultrasound waves, and the method produces an ultrasound image of the region inside the medium.

6. The imaging method according to claim 1, further comprising:
determining the image of the region by said processor and the array;
determining a metric value for pixels in the image; and
when the metric value is comprised in a first range, computing a pixel value in the image without using a transmit weighted vector, and
when the metric value is comprised in a second range different than said first range, computing a pixel value in the image using transmit weighting vectors, said transmit weighting vectors being different and orthogonal with respect to each other.

7. The imaging method according to claim 6, wherein the metric value is determined for distinguishing a pixel in the image corresponding to a reflective signal from a pixel in the image corresponding to a speckle signal.

8. The imaging method according to claim 6, wherein the metric value is determined via calculating an autocorrelation function.

9. The imaging method according to claim 8, wherein the metric value is a mean value of the autocorrelation function for lags comprised between 10 degrees and 30 degrees.

10. A non-transitory computer-readable storage medium on which is stored a computer program including instructions to execute the method according to claim 1, when said program is executed by a computer.

11. The method according to claim 1, wherein, during the combining, the beamformed pixel values $U_n(x,z)$ calculated using all of the plurality of transmit weighting vectors are combined to provide the pixel value I(x,z) of the respective pixel inside the image.

12. An apparatus for producing an image of a region inside a medium, the apparatus comprising:
a processor connected to an array of transducers in relation with said medium,
wherein the array and the processor are configured to:
transmit a plurality of waves inside the medium by the transducers,
acquire a set of data by said transducers in response to the plurality of waves,
beamform process the set of data by a plurality of beamforming processes providing beamformed pixel values $U_n$ (x, z) of at least a portion of the image, each of the beamforming processes using a transmit weighting vector $W_{Tn}$ in calculating the beamformed pixel values,
combine the calculated beamformed pixel values together to provide a pixel value I (x, z) of each of a plurality of pixels in the image,
wherein the transmit weighting vectors $W_{Tn}$ are different and orthogonal with respect to each other, each of the transmit weighting vectors $W_{Tn}$ generating uncorrelated speckle noise, a transmit weighting vector of index i being orthogonal to a transmit weighting vector of index j, index i being different of index j, and $$\sum_{l=1}^{L} W_{Ti}(l).W_{Tj}(l) = 0$$

that is a dot product, L being the number of components of the transmit weighting vectors $W_{Tn}$,
wherein the transmit weighting vectors $W_{Tn}$ are applied during the beamform processing, and
during the beamform processing, each of the beamforming processes is a synthetic beamforming in which the beamformed pixel values $U_n$ (x, z) are calculated by the following formula:

$$U_n(x, z) = \sum_{m=1}^{M} W_{Tn}[m] \sum_{l=l1}^{l2} W_R[l]DS(k - \tau(x, z, l, m), l, m)$$

where
DS(k, l, m) is a matrix of the set of data,
$W_R$ is a receive weighting vector,
$\tau$(x, z, l) is a delay function adapted for the beamforming process,
k is an index of a sample over time,
l is an index of a transducer in the array, comprised between l1 and l2, an aperture to beamform a line,
m is the index, comprised between 1 and M, M being the number of transmitted waves inside the medium,
n is the index, comprised between one and N, N being the number of transmit weighting vectors,
$W_{Tn}$ is the transmit weighting vector, x, z are coordinates of a pixel inside the image, and
the receive weighting vector and the transmit weighting vector being computational vectors; and
computing the image, wherein the transmit weighting vectors $W_{Tn}$ smoothen the speckle noise in the image.

13. The apparatus according to claim 12, wherein the synthetic beamforming process is one of a synthetic aperture focusing technique (SAFT) beamforming process, a virtual transducer SAFT beamforming process, a spatially coded SAFT beamforming process, a circular wave synthetic beamforming process, and a plane wave synthetic beamforming process.

14. The apparatus according to claim 12, wherein the processor and the array are further configured to implement:
determining the image of the region by said processor and the array,
determining a metric value for pixels in the image,
when the metric value is comprised in a first range, computing a pixel value in the image without using a transmit weighted vector, and
when the metric value is comprised in a second range different than said first range, computing a pixel value in the image using transmit weighting vectors, said transmit weighting vectors being different and orthogonal with respect to each other.

* * * * *